United States Patent [19]

Money et al.

[11] Patent Number: 5,084,531
[45] Date of Patent: Jan. 28, 1992

[54] EPOXY RESINS CONTAINING EPOXIDIZED POLYBUTENES

[75] Inventors: Joanna K. Money, Oak Park; Lawrence J. Beck, Bolingbrook, both of Ill.

[73] Assignee: Amoco Corporation, Chicago, Ill.

[21] Appl. No.: 706,027

[22] Filed: May 28, 1991

Related U.S. Application Data

[62] Division of Ser. No. 402,086, Aug. 3, 1989.

[51] Int. Cl.$^5$ .............................................. C08L 63/02
[52] U.S. Cl. .................................... 525/524; 525/113
[58] Field of Search ................................ 525/113, 524

[56] References Cited

U.S. PATENT DOCUMENTS 4,433,078  2/1984  Kersten et al. ...................... 525/524

FOREIGN PATENT DOCUMENTS 55-115442  9/1980  Japan .................................... 525/524

OTHER PUBLICATIONS

Polymer Chemistry, The Basic Concepts, by Paul C. Hiemenz, pub. by Marcel Dekker Inc., New York, N.Y., 1984, pp. 548–553.

Primary Examiner—Morton Foelak
Attorney, Agent, or Firm—Reed F. Riley; William H. Magidson; Ralph C. Medhurst

[57] ABSTRACT

Epoxy resins containing epoxidized polybutenes and a process for preparing them are disclosed. The cured epoxy resin containing epoxidized polybutene demonstrates improved flexibility and ductility and improved chemical and water resistance with no loss in heat deflection temperature.

11 Claims, No Drawings

EPOXY RESINS CONTAINING EPOXIDIZED POLYBUTENES

This is a division of application Ser. No. 402,086, filed Aug. 31, 1989.

FIELD OF THE INVENTION

This invention relates to epoxy resins containing epoxidized polybutenes and to a method for their preparation. More particularly, the present invention relates to room temperature cured epoxy resins containing epoxidized polybutenes.

Room temperature cured epoxy resins are finding increasing use in epoxy resin coating and adhesive applications. Epoxy resins are generally brittle and lack chemical resistance to acids and bases and also water. Modification of the properties of epoxy resins to obtain increased flexibility, ductility, and chemical resistance has been sought by many investigators in the prior art without success.

The field of this invention accordingly relates to room temperature-cured epoxy resins which incorporate epoxidized polybutenes into the cured epoxy resin and to a method for their preparation. The cured epoxy resin containing epoxidized polybutene has increased flexibility, ductility, chemical and water resistance over an equivalent epoxy resin containing no epoxidized polybutene with no concomitant loss in heat deflection temperature. The field of the invention also relates to the method of preparation of these epoxy resins. Prior investigators had found that incorporation of polybutenes into room temperature cured epoxy-resins was unsuccessful because, during the process of curing, the polybutene was typically incompatible with the epoxy resin and was squeezed out by the epoxy resin as it cured.

BACKGROUND OF THE INVENTION

Epoxy resins have a spectrum of properties that are well adapted for use in coatings, adhesives, fiber reinforced laminates, composites, engineering plastics, and specialty applications, such as potting resins and mortars. Among those properties are corrosion and solvent resistance, good adhesion and electrical properties, good dimensional stability, hardness, low shrinkage on cure and many other beneficial properties.

Epoxy resins and processes for their production by the reaction of dihydric phenols and epichlorohydrin in the presence of a condensing agent such as caustic soda are well known. Such resins vary in their physical state from liquids to semi-solids to solids and are generally cured to thermoset conditions in the presence of chemical hardening agents such as aromatic amines. Resins produced by such curing have a high molecular weight which renders them particularly suitable for use as coatings, adhesives, and laminates and for use as potting and encapsulating compositions. U.S. Pat. No. 3,293,213 and 3,370,038 teach preparation of typical epoxide resins.

One property of cured epoxide resins which is extremely desirable and useful is a high heat distortion or deflection temperature with its attendant good resistance to solvents and electricity. This property is especially useful for heat resistant coatings and adhesives.

Unfortunately, a major disadvantage of epoxy resins concerns an undesirable brittleness. A partial solution to such a problem has been the addition of reactive liquid polymers (RLP). These RLP's are generally elastomers, such as carboxyl-terminated butadiene-acrylonitrile copolymers, which precipitate out of solution during cure of the polyepoxide. The precipitation results in the formation of discrete elastomer particles or domains which toughen the resin. Although toughening the cured resin, such a technique results in a significantly lowered softening temperature. Particle size is a major factor which determines the mechanical properties. The selectivity and reactivity of the functional groups are critical in the formation of the particles. Also, the curing conditions seriously affect their size and structure. Another disadvantage is that the RLP is limited to low viscosity. Yet another disadvantage involves the relatively poor thermal and oxidative stability of polymers comprising polymerized monomers such as butadiene.

Curable epoxy resin compositions containing acrylate rubbers are disclosed in European Patent Application No. 78527. For example, the reference discloses polyepoxides containing rubbers prepared from butyl acrylate. Unfortunately, said rubbers are soluble in the polyepoxide continuous phase at temperatures above about 51° C., and in some instances at room temperature. Thus, undesirable softening of the cured resin can readily occur. In addition, it is difficult to control particle size of the dispersed phase polymerizate because dissolving and reprecipitation of said polymerizate is difficult to control. Control of parameters such as particle size of the polymerizate are critical in optimizing mechanical properties of the composition.

Curable blends of epoxy resins and organopolysiloxanes are disclosed in U.S. Pat. Nos. 3,843,577 and 3,926,885. Such epoxy resin composites are disclosed as being dispersions of organopolysiloxanes in an epoxy resin continuous phase. Dispersing agents are employed in preparing such composites. Although the composites are disclosed as having self-lubricating properties, the mechanical properties of such composites are not as great as would be desirable.

It would be highly desirable to provide a process for significantly improving the toughness of epoxy resins without sacrificing the other properties which would extend the utility of said resins. It would be particularly desirable to provide a product having high heat distortion temperature properties in the cured form. In addition, it would be desirable to provide a room-temperature-cured epoxy resin which has increased flexibility, ductility, and chemical and water resistance.

SUMMARY OF THE INVENTION

Epoxy resins containing epoxidized polybutenes and a method for their preparation are disclosed. Epoxidized polybutenes of molecular weight up to 2000 formulated with polyamino-amide curing agents are added in amounts of up to about 50 weight percent to the epoxy resin which is then cured at room temperature.

The epoxidized polybutenes are characterized as being prepared by epoxidizing a polybutene. The polybutenes are prepared by polymerizing a butene such as isobutene with a Lewis acid catalyst. The resulting epoxide resin containing epoxidized polybutene demonstrates improved flexibility and ductility and improved chemical and water resistance with no loss in heat deflection temperature.

DETAILS OF THE INVENTION

Polybutene epoxides useful in the process of this invention are hydrocarbon polymers with epoxide functionality at one end, providing a means of chemically incorporating hydrophobic characteristics.

The olefin structure of the polybutene used to make the epoxidized polybutene for the instant invented process for preparation of a room-temperature-cured epoxy resin containing an epoxidized polybutene preferably comprises about 10% vinylidene or terminal double bonds, about 70% trisubstituted double bonds and about 20% tetrasubstituted double bonds.

These preferred polybutenes are made by the polymerization of isobutene using aluminum chloride as the Lewis acid catalyst. However, other polybutenes made by polymerizing other butenes by other Lewis acid catalysts are also suitable. Suitable polybutenes are those available from Amoco Chemical Company, Chicago, Ill. The polybutene is epoxidized by reaction with, for example, a peracid. The epoxidized polybutene is added to a polyamino-amide curing agent which cures epoxy resins at room temperatures. Preferably, the epoxidized polybutene has a number average molecular weight within the range of from about 200 to about 2000. More preferably, the number average molecular weight of epoxidized polybutenes is from about 300 to about 1000, as determined by vapor phase osmometry.

Polybutenes produced in the presence of a Lewis acid such as an aluminum chloride catalyst can be considered to be mono-olefins, i.e. an average of one double bond per molecule of polybutene, in which the olefin or double bound structure is primarily of the trisubstituted and tetrasubstituted types. When such polybutenes are epoxidized, the resulting epoxide group is also primarily of the trisubstituted and tetrasubstituted types. Particularly preferred epoxidized polybutenes are Actipol (Trademark) activated polybutenes (Amoco Chemical Company, Chicago, Ill. 60601), under the designation of Actipol (Trademark) E6, Actipol (Trademark) E16, and Actipol (Trademark) E23. Average molecular weight of these epoxidized polybutenes, by vapor phase osmometry, are 365, 973 and 1433, respectively.

Optimum incorporation of the epoxidized polybutenes into the epoxy resin formulation is in the range of from about 0.5 wt. % to about 50 wt. % of the total weight of the epoxy resin. Preferably, the more optimum amount of incorporation of the epoxidized polybutene is in the range of from about 2 wt. % to about 22 wt. % of the total weight of the epoxy resin. More preferably, the more optimum amount of incorporation of the epoxidized polybutene into the epoxy resin is in the range of from about 2 wt. % to about 15 wt. % of the total epoxy resin. Although amounts greater than about 15 wt. % are incorporated with ease in the method of this invention into the epoxy resin, the resulting epoxidized resin may tend to soften.

Preferably, the lower molecular weight epoxidized polybutene of the number average molecular weight range of from about 200 to about 400 is incorporated in the epoxy resin for maximum improvement in epoxy resin properties with most efficient incorporation of the epoxidized polybutene into the epoxy resin. The higher molecular weight epoxidized polybutenes incorporate with less efficiency in the epoxy resin. Incorporation of the epoxidized polybutene can be obtained by thorough mixing of the epoxidized polybutene with the curing agent prior to adding the epoxidized polybutene-curing agent mixture to the epoxy resin. Higher molecular weight epoxidized polybutenes require more thorough mixing with the curing agent to obtain desired results than do lower molecular weight epoxidized polybutenes.

Any polyamine curing agent can be used. A preferred curing agent is a polyamino-amide curing agent such as Versamid (Trademark) Polyamide Resins, Henkel Corporation Resins Division, Minneapolis, Minn. 55436, which are condensation products of polyamines with dimer acids or fatty acids. These curing agents cure at room temperature and are compatible with epoxidized polybutenes of number average molecular weight from about 200 to about 2000. It is considered that any curing agent which cures at about room temperature and is compatible with epoxy polybutenes of about 200 to about 2000 number average molecular weight can be used.

Other compounds commonly used in formulating cured epoxy resins can also be added to the formulation for desirable properties. For example, benzyl alcohol or other compatibilizing agents such as those taught in U.S. Pat. No. 4,751,278 at column 3, lines 48–55, can be added to the formulation for better mixing.

Epoxy compounds useful in this invention include a wide variety of epoxy resins which are also referred to as polyepoxides. Polyepoxides useful herein can be monomeric (e.g., the diglycidyl ether of bisphenol A), higher molecular weight advanced resins or polymerized unsaturated monoepoxides (e.g., glycidyl acrylate, glycidyl methacrylate, alkyl glycidyl ether, etc.) to homopolymers or copolymers. Most desirably, epoxy compounds contain, upon the average, at least one pendant or terminal 1,2-epoxy group (i.e., vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, and mixtures thereof. Numerous polyepoxides prepared from polhydric phenols include those which are disclosed, for example, in U.S. Pat. No. 4,431,782. Polyepoxides can be prepared from mono-, di- and trihydric phenols, and can include the novolac resins. Polyepoxides can include the epoxidized cycloolefins; as well as the polymeric polyepoxides which are polymers and copolymers of glycidyl acrylate, glycidyl methacrylate and allylglycidyl ether. Suitable polyepoxides are disclosed in U,S. Pat. Nos. 3,804,735; 3,892,819; 3,948,689; 4,014,771 and 4,119,609; and Lee and Neville, *Handbook of Epoxy Resins*, Chapter 2, McGraw Hill, New York (1967).

While the invention is applicable to polyepoxides, generally preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol, and a sufficient amount of caustic alkali to combine with the halogen of the halohydrin. The products are characterized by the presence of more than one epoxide group, i.e., a 1,2-epoxy equivalency greater than one.

The polyepoxide may also include a minor amount of a monoepoxide, such as butyl glycidyl ether, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formation and adjustments are made in the amount of curing agent and other parameters to reflect that change.

In the process of the invention, it was found that epoxidized polybutenes were compatible with Versamid (Trademark) Resins as curing agents with mixing. The epoxidized polybutene can be added to the curing agent or vice versa, as there is apparently no discernible reaction between the two materials. The mixture is then combined with the epoxy resin. In a laboratory procedure, the mixture of epoxidized polybutene and curing agent can be added to the epoxy resin. In a commercial procedure standard epoxy resin mixing procedures are typically used.

The amounts of curing agent are the amounts typically used to cure epoxy resins and are taught in the prior art.

Electron microscopy examination copy of samples of epoxy resins prepared by the process of the instant invention indicated that small microvoids were present in the epoxy resin samples containing greater than 2% incorporation. The microvoids were dispersed throughout the samples of epoxy resins and the resins were stable at a temperature as high as 150° C. The microvoids were larger at greater levels of incorporation of epoxidized polybutene. It has not been determined whether the epoxidized polybutene reacts with the epoxy resin but upon examination under an electron microscope, the presence of epoxidized polybutene droplets could not be discerned in epoxy resin containing epoxidized polybutene.

In summary, the instant invention comprises a curable epoxy resin containing from about 0.5 wt. % to about 50 wt. % of epoxidized polybutene of a molecular weight of from about 200 to 2000 molecular weight. The curable epoxy resin is cured in the presence of a polyamine curing agent at a temperature within the range of from about 20° C. to about 30° C. at atmospheric pressure. The cured epoxy resin has increased flexibility and ductility produced by incorporating epoxidized polybutene into the epoxy resin. Preferably, the said curable epoxy resin contains from about 2 wt. % to about 22 wt. % of the said epoxidized polybutene. Preferably, the polyamine curing agent is a polyaminoamide curing agent and the epoxidized polybutene is prepared by epoxidizing a polybutene using about 10% vinylidene double bonds, 70% trisubstituted double bonds and about 20% tetrasubstituted double bonds.

The instant invention also includes a process for preparing cured epoxy resins containing epoxidized polybutene which process comprises: a) mixing an epoxidized polybutene of number average molecular weight range of from about 200 to about 2000 molecular weight with a polyamino-amide curing agent capable of curing an epoxy resin at room temperature from about 20° C. to about 30° C. and atmospheric pressure to form a mixture; b) adding said mixture to an epoxy resin wherein said epoxy resin is present in an amount such that said epoxidized polybutene is present in an amount of from about 0.5 wt. % to about 50 wt. % of said amount of said epoxy resin; c) curing said epoxy resin with said mixture of said curing agent and said epoxidized polybutene at said room temperature and said atmospheric pressure. Preferably the epoxidized polybutene comprises about 10% vinylidene double bonds, about 70% trisubstituted double bonds, and about 20% tetrasubstituted double bonds. The epoxidized polybutene is prepared from a polybutene prepared from hydrocarbons in the presence of a Lewis acid catalyst. Preferably the Lewis acid catalyst is aluminum chloride. Preferably the epoxidized polybutene is present in an amount from about 2 wt. % to about 22 wt. % and said epoxidized polybutene is of a number average molecular weight range of from about 300 to 1000.

The following examples are presented for the purpose of illustration only and are not intended to limit the scope of the invention.

EXAMPLE 1

The following example illustrates the process of the invention upon a laboratory scale. Epoxidized polybutene, Actipol (Trademark) E6, Amoco Chemical Company, Chicago Ill., molecular weight, 365; 26.8 grams, (10 wt. % of the epoxy resin), was added to Versamid (Trademark) 140, 88.2 grams in a one-liter flask with hand mixing. The mixture was then mixed on a Rotovap for several minutes and added to an epoxy resin, 268 grams, Epon (Trademark) 828 Shell Chemical Company, Houston, Tex. The mixture was then spread out in molds to prepare plaques and to cure. The properties of the cured samples were then determined.

Properties of the reactants were as follows:

| Actipol (TM) E6 | |
|---|---|
| Viscosity, ASTM D 445 at 38° C. | 65 cSt |
| Acid Number, ASTM D 974 | 0.2 |
| Average Mol. Wt. vapor phase osmometer | 364 |
| Epon (TM) 828 | |
| Epoxide Equiv. Wt. | 185–192 |
| Viscosity at 25° C. (poise) | 11.0–15.0 |
| Wt. (lb./gal.) | 9.7 |
| Versamid (TM) 140 | |
| Amine Value - mg KOH/gm Resin | 370–400 |
| Theoretical, Amino Hydrogen Eq. Wt. | 125 |
| Viscosity at 25° C. (poise) | 80–120 |
| Wt. (lb./gal.) | 8.1 |

The example was repeated with percentages of epoxidized polybutene of from 0 to 22. The effect of the addition of epoxidized polybutene, Actipol (TM) upon the properties of the epoxy resin is given in Tables I and II. The data indicate that incorporation of epoxidized polybutene into epoxy resins, in amounts greater than 0% improves the properties of the cured epoxy resin. Theoretically, it is considered that there is no limit to the amount of epoxidized polybutene which can be incorporated into an epoxy resin, although it is considered an economic limit is about 50 wt. % due to the softening of the epoxy resin containing the epoxidized polybutene.

TABLE I

Effect of Actipol Content on Physical Properties of Epoxy Resins

| % Actipol E6 | Tg C | HDT C (284 psi) | Tensile Str. (% elong) | Tensile Modulus psi × $10^3$ |
|---|---|---|---|---|
| 0 | 35, 50 | 102 | 5205 (1.35) | 458 |
| 2 | 31, 48 | 106 | 6022 (1.77) | 470 |
| 4 | 28 | 105 | 8168 (3.28) | 426 |
| 6 | 33, 50 | 104 | 7952 (3.58) | 376 |

TABLE I-continued

Effect of Actipol Content
on Physical Properties of Epoxy Resins

| % Actipol E6 | Tg C | HDT C (284 psi) | Tensile Str. (% elong) | Tensile Modulus psi × 10³ |
|---|---|---|---|---|
| 10 | 32, 50 | 101 | 8012 (3.32) | 357 |
| 14 | 26, 49 | 110 | 6578 (3.35) | 316 |
| 18 | 39, 48 | 108 | 5827 (3.24) | 292 |
| 22 | 35, 33 | 109 | 5322 (2.98) | 281 |
| 10% + BzOH[2] | 35, 49 | 113 | 8102 (4.48) | 348 |
| 10% E16[3] | 33, 50 | 109 | 7353 (3.20) | 386 |
| 10% E16[4] + BzOH | 35, 51 | 119 | 7604 (3.04) | 358 |

Notes:
[1] br indicates the majority of sample bars tested broke. (Table II)
[2] BzOH - benzyl alcohol added as dispersant
[3] Actipol (TM) E16 - mol. wt. 973
[4] Actipol (TM) E16 plus benzyl alcohol

TABLE II

Effect of Actipol Content
on Physical Properties of Epoxy Resins

| % Actipol E6 | Izod notched ft-lb/in | Flex Str (max strain) psi × 10³ | Flex Modulus[1] psi × a0³ |
|---|---|---|---|
| 0 | 0.31 | 11.4 (4.54) | 378 |
| 2 | 0.39 | 12.3 (4.58) | 385 |
| 4 | 0.40 | 11.8 (4.70) | 357 |
| 6 | 0.42 | 12.0 (4.77) | 364 |
| 10 | 0.43 | 10.1 (4.82) | 310 |
| 14 | 0.40 | 9.8 (4.64) | 298 |
| 18 | 0.40 | 9.2 (4.54) | 276 br |
| 22 | 0.35 | 8.5 (4.55) | 264 br |
| 10% + BzOH | 0.56 | 10.9 (4.87) | 350 |
| 10% E16 | 0.39 | 10.9 (4.16) | 327 br |
| 10% + BzOH | 0.39 | 10.7 (3.99) | 350 br |

(see footnotes from Table I)

The above data indicate physical properties of the epoxy resin were improved by addition of epoxidized polybutene in amounts of from 2 to 22 wt. % of the epoxy resin. For example, an increase in both tensile strength and % elongation as well as an increase in impact strength were obtained.

EXAMPLE II

The samples prepared in Example I were tested for chemical resistance in 10% hydrochloric acid, 10% sodium hydroxide, 10% sulfuric acid, 10% acetic acid and in methanol. Results are in Tables III and IV which show the improvement provided by incorporating the epoxidized polybutene, i.e. reduced weight gain.

TABLE III

Chemical Resistance of Actipol Modified Epoxy Resins[1]
% Weight Gain After 30 Days in Various Media

|  | Control | 2% E6 | 4% E6 | 10% E6 |
|---|---|---|---|---|
| 10% HCl | 1.95 | 1.14 | 1.13 | 1.23 |
| 10% NaOH | 1.49 | 1.12 | 1.03 | 1.25 |
| 10% H₂SO₄ | 3.19 | 1.15 | 1.12 | 1.08 |
| 10% Acetic Acid | 13.46 | 7.99 | 7.28 | 7.02 |
| MeOH | 26.71 | 21.80 | 22.83 | 23.54 |

[1] All material made using Epon (TM) 828 and Versamid (TM) 140 and cured at room temperature.

TABLE IV

Chemical Resistance of Actipol Modified Epoxy Resin[1]
% Weight Gain after 30 Days in Various Media

|  | 10% E16 | 10% E6 + BzOH | 10% E16 + BzOH |
|---|---|---|---|
| 10% HCl | 1.19 | 1.08 | 1.04 |
| 10% NaOH | 0.98 | 1.03 | 0.81 |
| 10% H₂SO₄ | 1.17 | 1.04 | 1.16 |
| 10% Acetic Acid | 8.36 | 4.00 | 3.92 |
| MeOH | 24.45 | 16.64 | 16.85 |

(see footnotes on Table III)

EXAMPLE III

Samples prepared in the procedure of Example I were subjected to a cure to determine effect on the epoxy resin properties. The samples were cured at room temperature for 24 hours and then for 2 hours at 90° C. Heat deflection temperature increased from 102° C. at 264 psi to 135° C. in the sample containing 10% Actipol (TM) E6.

EXAMPLE IV

Samples were prepared in the procedure of Example I using epoxides made by Viking Chemical Company, Minneapolis, Minn. The epoxides used were commercially available epoxidized oils made from linseed oil and soya oil and were added to Epon (TM) 828. Versamid (TM) 140 was the curing agent. The epoxidized oils were added in amounts of 10 wt. % of the epoxy resin. A control prepared with Actipol (TM) E6 had superior properties in tensile strength, Izod notched, flex moldulus over a 24 hour period.

EXAMPLE V

In the procedure of Example I, polybutene, molecular weight 350, L-14, Amoco Chemical Company, Chicago, Ill., was substituted for an equal amount of epoxidized polybutene in the formula of Example I. The resulting mixture was spread in molds to prepare plaques and to cure. The plaques exuded the polybutene and were sticky.

The above indicates that polybutenes which are not epoxidized are unsuitable for the process of the instant invention.

What is claimed is:
1. A composition useful in making cured epoxy resin comprising an epoxidized polybutene of number average molecular weight within the range of from about 200 to 2000 and a polyamine curing agent wherein the amount of said epoxidized polybutene in said composition is sufficient to give a cured epoxy resin made from said composition and uncured epoxy resin which contains said epoxidized polybutene in an amount from about 0.5 wt. % to about 50 wt. % of the amount of said uncured epoxy resin.

2. The composition of claim 1 wherein said amount of said epoxidized polybutene in said composition is sufficient to give a cured epoxy resin made from said composition and uncured epoxy resin which contains said epoxidized polybutene in an amount from about 2 wt. % to about 22 wt. % of the amount of said uncured epoxy resin.

3. A composition useful in making a cured epoxy resin comprising an uncured epoxy resin and an epoxidized polybutene of number average molecular weight within the range from about 200 to 2000, curable by reaction with a polyamine curing agent said composition containing said epoxidized polybutene in an amount from about 0.5 wt. % to about 50 wt. % of said uncured epoxy resin.

4. The composition of claim 3 containing said epoxidized polybutene in an amount from about 2 wt. % to about 22 wt. % of said uncured epoxy resin.

5. A cured epoxy resin containing epoxidized polybutene of number average molecular weight within the range from about 200 to 2000 wherein said epoxidized polybutene is present in an amount between about 0.5 wt. % to about 50 wt. % of the uncured epoxy resin used to make said cured epoxy resin.

6. The cured epoxy resin of claim 5 wherein said amount of said epoxidized polybutene is present in an amount from about 2 wt. % to about 22 wt. % of the uncured epoxy resin used to make said cured epoxy resin.

7. The cured epoxy resin of claim 5 wherein said epoxidized polybutene is prepared from a polybutene having about 10% vinylidene double bonds, 70% trisubstituted double bonds and about 20% tetrasubstituted double bonds.

8. The cured epoxy resin of claim 5 cured using a polyamine capable of curing said uncured epoxy resin at 20° C. to about 30° C. at atmospheric pressure.

9. The cured epoxy resin of claim 5 cured using a polyaminoamide capable of curing said uncured epoxy resin at 20° C. to about 30° C. at atmospheric pressure.

10. The cured epoxy resin of claim 5 wherein said resin has increased flexibility and ductility produced by incorporating said epoxidized polybutene.

11. The cured epoxy resin of claim 5 wherein said resin has a number average molecular weight within the range from about 300–1000.

* * * * *